(No Model.) 3 Sheets—Sheet 1.
E. B. BROOKE.
MACHINE FOR MOLDING EARTHENWARE PIPES, &c.
No. 475,481. Patented May 24, 1892.
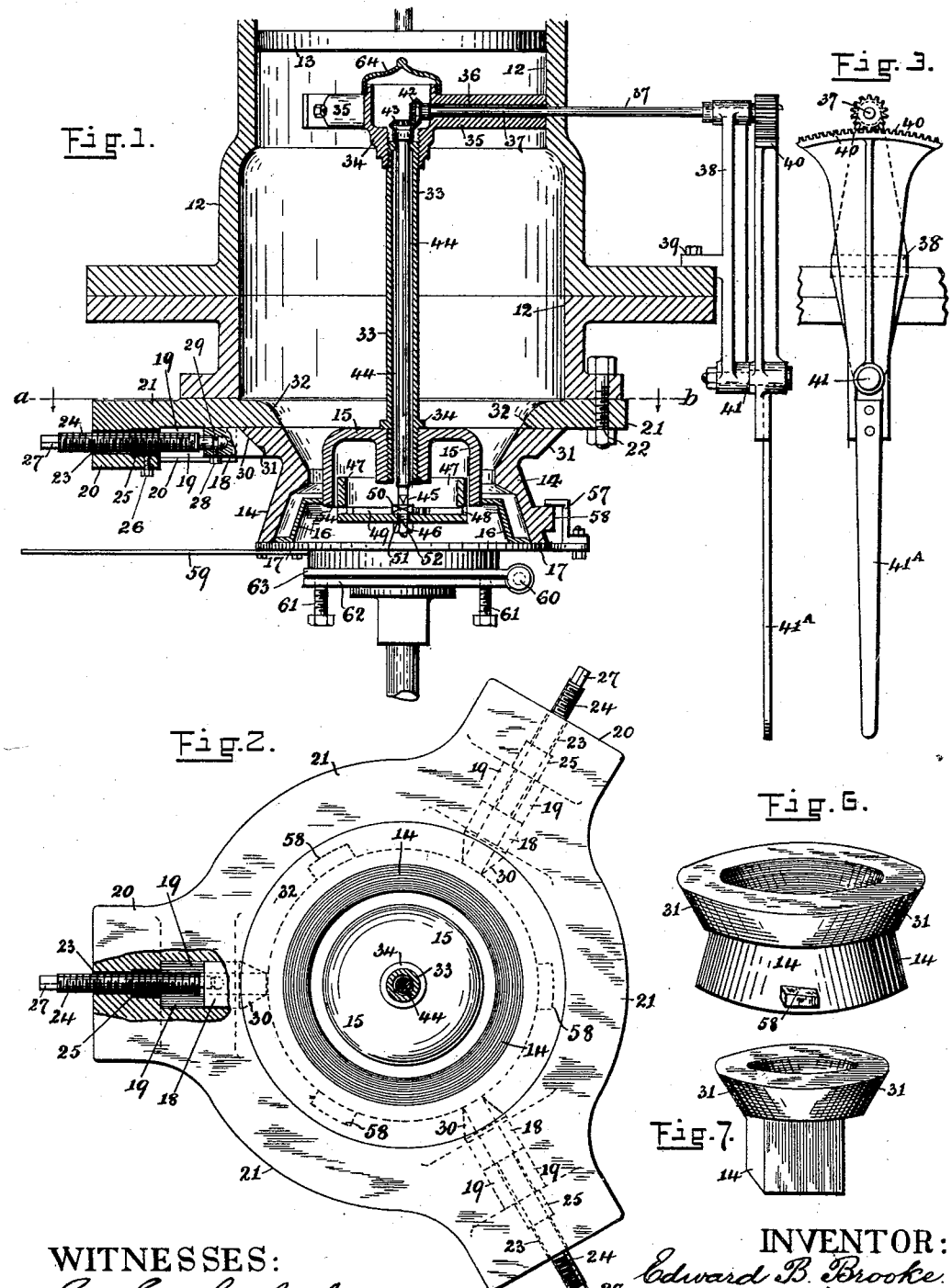
WITNESSES:
Geo. L. Wheelock
Walter Allen
INVENTOR:
Edward B. Brooke
by Herbert W. Jenner
Attorney (No Model.) 3 Sheets—Sheet 2.
E. B. BROOKE.
MACHINE FOR MOLDING EARTHENWARE PIPES, &c.
No. 475,481. Patented May 24, 1892.
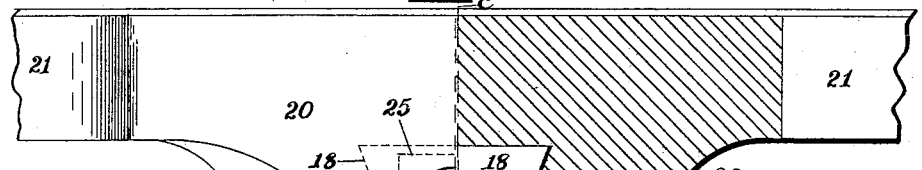
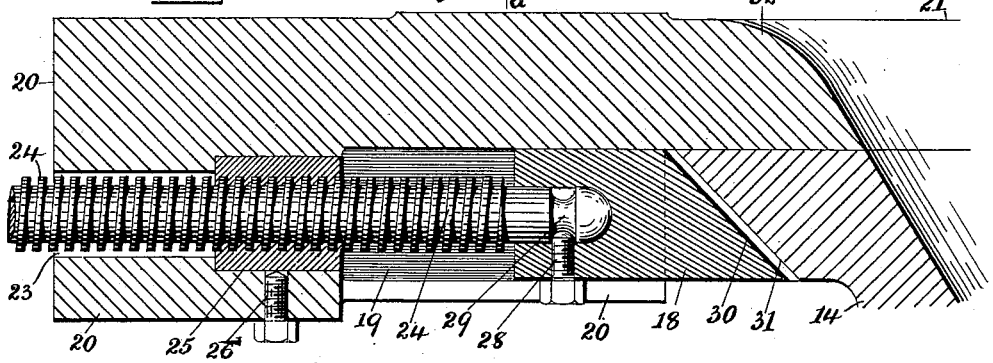
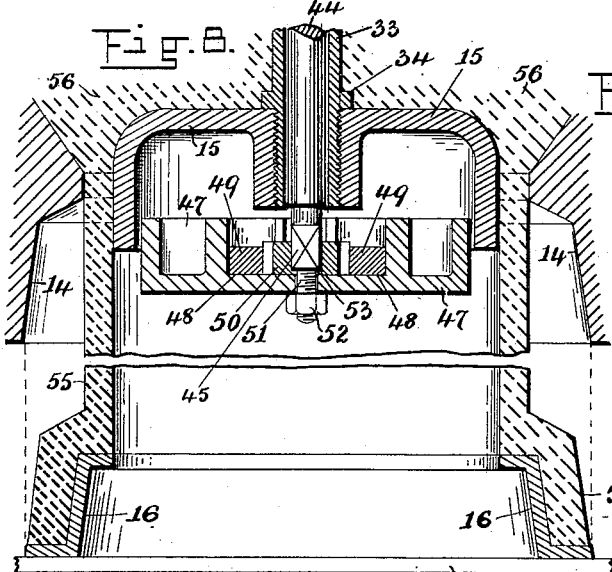
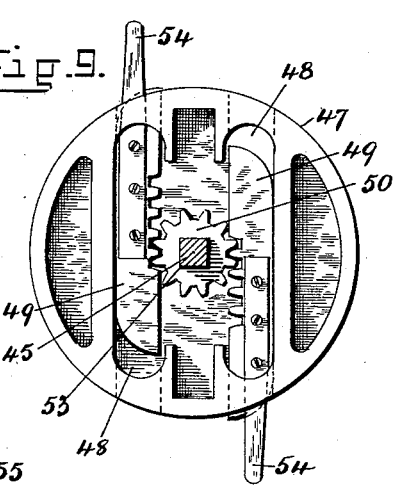
WITNESSES:
Geo. L. Whitlock
Walter Allen
INVENTOR:
Edward B. Brooke
by Herbert W. T. Jenner
Attorney.

(No Model.) 3 Sheets—Sheet 3.
E. B. BROOKE.
MACHINE FOR MOLDING EARTHENWARE PIPES, &c.

No. 475,481. Patented May 24, 1892.

WITNESSES: Geo. L. Wheelock, Walter Allen

INVENTOR: Edward B. Brooke
by Herbert W. T. Jenner, Attorney

UNITED STATES PATENT OFFICE.

EDWARD BURKILL BROOKE, OF HUDDERSFIELD, ENGLAND.

MACHINE FOR MOLDING EARTHENWARE PIPES, &c.

SPECIFICATION forming part of Letters Patent No. 475,481, dated May 24, 1892.

Application filed December 15, 1891. Serial No. 415,121. (No model.)

*To all whom it may concern:*

Be it known that I, EDWARD BURKILL BROOKE, a citizen of Great Britain, residing at Huddersfield, in the county of York, England, have invented certain new and useful Improvements in Machines for Pressing or Molding Earthenware Pipes, Bricks, and the Like; and I do hereby declare the following to be a full, clear, and exact description of the invention, such as will enable others skilled in the art to which it appertains to make and use the same.

This invention relates to machines for pressing or molding fire-clay into pipes, bricks, blocks, and like articles.

The object of my invention is to provide mechanism whereby one die-holder will answer for several sizes and shapes of dies which are interchangeable without the removal of said die-holder from the machine; to operate the knives for severing molded hollow articles from the clay in the cylinder, and to secure the balance-table to the die while pressure is applied to squeeze the clay into the die or mold.

To the aforesaid purpose my invention consists in the novel and peculiar arrangement of the parts, hereinafter severally described.

Figure 10:
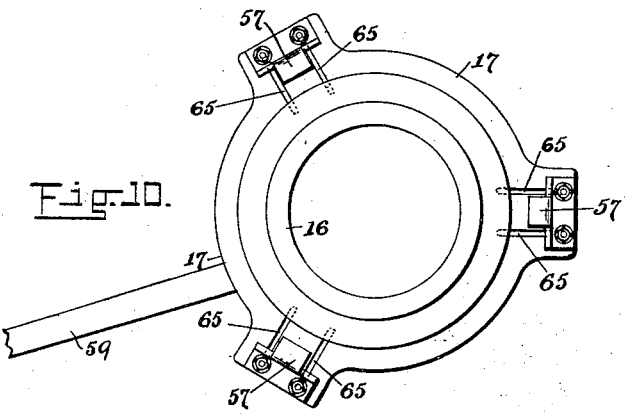
Figure 11:
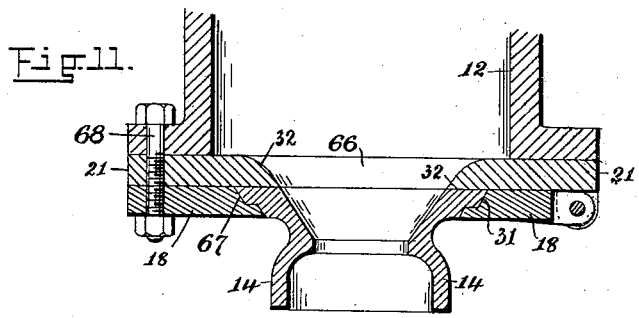

In the accompanying drawings, Figure 1 is a sectional elevation of the lower portion of the clay-cylinder of a pipe and brick making machine, showing the die-holders, die, bell-core, and balance-table secured thereto. Fig. 2 is a plan on line *a b* of Fig. 1 of Plate 21, a portion of which is cut away to expose one of the die-holders and adjacent parts. Fig. 3 is an end elevation of a portion of the mechanism for operating the cutting-knives. Fig. 4 is an enlarged end elevation, half in section, of one of the die-holders and parts and a portion of Plate 21, in which they are supported. Fig. 5 is a transverse or cross-section of Fig. 4, taken on line *c d*. Figs. 6 and 7 are geometrical views of the dies, the former being a die for forming pipes and the latter for forming bricks or like angular articles. Fig. 8 is an enlarged section of part of die, "bell-core," and box containing cutting-knives and shows a molded pipe ready for being severed from the clay in the cylinder. Fig. 9 is a plan of box containing the cutting-knives and mechanism for operating same. Fig. 10 is a plan of balance-table and fingers adapted to engage with projections on the die to secure said table thereto. Fig. 11 is a section of part of clay-cylinder and of modified construction of die-holder, showing the die secured therein.

Like numbers of reference designate corresponding parts throughout.

Referring to the drawings, the number 12 represents the clay-cylinder, into which clay is placed by an attendant in the usual way, this clay being forced or squeezed by piston 13 (which is shown at its lowest stroke) into the die 14, which gives the outward formation to the pipes or articles made in the machine, the inside of the pipe being formed by the bell-core 15, and the internal socket at the end of the pipe by the hollow cap 16, secured to balance-table 17.

The die-holders comprise three sections or blocks 18, arranged as shown in plan view, Fig. 2, whose sides are beveled or inclined and engage with corresponding beveled ways 19, formed in the thickened extensions 20 of the plate 21, which latter is secured to the bottom flange of the clay-cylinder by bolts and nuts, as shown at 22. The extensions 20 have holes 23 bored or formed therein for receiving screws 24, which are rather smaller in diameter than the holes 23, said holes terminating in square sockets adapted to receive nuts 25, which are secured therein by set-screws 26. The nuts 25 have internal screw-threads of the same pitch as the threads of screws 24, which are capable of working endwise through said nuts. The outer ends of the screws 24 are provided with square heads 27, upon which a hand-key is placed to operate the screws, the opposite ends being inserted into sockets in the die-holders 18 and secured therein by set-screws 28, entering annular grooves 29 in the ends of aforesaid screws. The rotation of the screws 24 in one direction or the other causes them to work through the nuts 25 and therefore slide the die-holders backward or forward in the ways 19. The ends 30 of the die-holders are inclined or wedge-shaped and are adapted to engage with the corresponding opposing inclined shoulder 31, formed on the upper and outer side of the die 14. The die, whose internal configuration and size depend upon the kind and size of articles to be made, is lifted up and placed with its upper edge against the under side of the plate 21, the shoulder 31 at the same time engaging with the inclined faces 30 of two of the die-holders 18, which by preference are first moved by the screws 24 to a position coincident with the diameter of the said shoulder. The remaining die-holder, which has been clear of the die, is now slid endwise by its screw 24 until the inclined face 30 thereon abuts against the shoulder on the die, by which means such die is secured to the machine. The dies are prevented from upward movement or displacement by the inner projecting edges 32 of the plate 21.

So long as the diameters of the shoulders on the dies are the same it is only necessary when changing one die for another to slide one of the die-holders 18 clear of the inclined shoulder, which permits of its removal and the insertion of another die without moving or disturbing the remaining die-holders. Should the first pipe or hollow article made be thicker on one side than the other consequent upon the die being slightly out of center, as may at times occur, the said die is forced either to one side or the other by slightly withdrawing one or two die-holders and sliding the remaining die holder or holders toward the center of the machine, the nicety of adjustment being at the control of the attendant, and in this way the defect is remedied. In enlarged section of one of the die-holders and its adjacent parts, Fig. 5, the die-holder is shown as being slightly removed from the inclined shoulder or flange 31 of the die.

The construction and arrangement of the die-holders and of dies to be employed in conjunction therewith and the manner in which they are operated and the die secured to the pipe and brick making machine, as hereinbefore described, saves considerable labor and time in removing and changing the dies, said die-holders answering for any size or shape of die within their limits of movement and therefore only necessitating the lifting of the die when a change is made. It is preferable to have the inclined shoulders on each die of equal diameters; but as the die-holders are movable inward or outward to a certain extent it follows that the diameters of the said shoulders may vary a little without affecting the die-holders otherwise than by their adjustment to the altered diameter.

Figs. 6 and 7 show the inclined shoulders 31 formed on a pipe and brick die, respectively.

The bell-core 15, which is used only when making pipes or like hollow articles, occupies a central position within the die and is screwed onto the lower end of the hollow spindle 33 and against the shoulder 34 thereon. The spindle 33 is screwed into the cup 34, which is cast with arms 35, bolted to the sides of the clay-cylinder, said arms being tapered to an edge top and bottom, so as to offer little obstruction to the clay. One of the arms has a hole 36 bored or formed through it to receive the horizontal shaft 37, journaled therein and in the bracket 38, bolted to the clay-cylinder at 39. The shaft 37 carries a pinion on its outer end, with which gears a segment 40, pivoted at 41 to the bracket 38, said segment terminating in a hand-lever 41$^A$. On the opposite end of the shaft 37 is mounted a bevel-wheel 42, gearing into a bevel-wheel 43 on the upper end of the vertical shaft 44, passing through the hollow spindle 33, the lower end of said vertical shaft 44 having a square head 45 thereon and terminating in a screw 46. 47 is a circular box adapted to enter the bell-core 15 and to be free to rotate therein, said box having ways 48, extending through the sides thereof, in which are placed bars 49, having teeth formed on their inner edges, with which engage the teeth of the pinion 50, placed loosely in the bottom of the box, as shown clearly in Figs. 8 and 9. The box 47 is also provided with an opening 51, through which passes the screw 46 on shaft 44, which is free to rotate in said opening without rotating the box, the latter being supported on the shaft 44 by the nut 52. In placing the box 47 in position, as shown, the square head 45 on vertical shaft 44 enters the square opening 53 in the pinion 50, and when the lever 41$^A$ is operated or pulled in one direction the segment 40 rotates pinion and shaft 37, and by bevels 42 and 43 the motion is communicated through vertical shaft 44 to the pinion 50, which moves or slides the toothed bars 49 outward to the positions shown in Fig. 9, when they and the said pinion become locked, and the motion of the shaft 44 being continued in the same direction the said parts and the box 47 are carried around bodily with the result that the knives 54, secured to upper sides of toothed bars 49, are caused to move in a circular path. By moving the lever 41$^A$ in the opposite direction the parts are brought back to their original positions.

In Fig. 1 the knives 54 (one only being seen) are drawn home to their normal positions, where they remain until the end of the pipe has been molded or pressed, the balance-table released and lowered, and the full length of the pipe made, as illustrated in Fig. 8, where 55 represents the finished pipe ready for being severed from the clay 56 in the clay-cylinder. Immediately this has been done the attendant moves the handle 41$^A$, so as to give motion to the shafts 37, 44, and pinion 50, as set forth, which latter forces the bars 49 outward, whereby the knives 54 pierce through the sides of the molded pipe at points almost lineable with the under side of the bell-core, and the bars and pinion then becoming locked, as previously described, they, with the knives and box, are moved around bodily, by which means the clay around the bell-core is severed by the knives 54. This is repeated with each pipe made by the machine, which, as soon as they are severed from the clay, are placed into the ordinary cradles and conveyed away for the subsequent processes of manufacture.

The table 17 is provided with bent fingers 57, Figs. 1 and 10, and three corresponding inclined projections 58 are cast on the outside of the die 14, with which said bent fingers are adapted to engage to secure the table to the die. The table is capable of being moved around by handle 59, and when rising up to the cylinder the attendant guides the fingers 57 between the projections 58, and on the said table abutting against the die 14 he turns it partially around so as to engage the fingers with the upper inclined surfaces of the projections by which the table is securely held against the die while pressure is applied to force or squeeze the clay into it. The table 17 is also hinged at 60, so that when the pipe or other article made has been severed it can be tilted into the "cradle" by lifting up said table by the handle 59.

When making arch bricks or like articles, which are cut or severed at an angle, the table 17 is raised to a corresponding angle by handle 59 and held or supported at that angle by the set-screws 61, screwed through the plate 62 and abutting against the under side of plate 63, which said plates form the hinge for the table 17.

In making bricks and other solid blocks the bell-core is not required and is unscrewed from the spindle 33 and removed from the machine, as are the box 47 and knives and parts therein, and the hollow cap 16 and the bricks are cut or severed from the clay by any of the arrangements of cutters now in use and in the same manner. The hollow spindle 33, shafts 37 and 44, and gearing mounted thereon are also removed from the machine, the bevels 42 and 43 being reached through the top of the cup 34, which is closed by a screwed cap 64.

The bent fingers 57 are secured to table 17 by bolts and nuts passed through slots 65, which are provided so that the fingers may be adjusted for different sizes of dies. The bent fingers may be formed on or secured to the die and engage with lugs or projections on the table 17.

A modified construction of die-holder is shown at Fig. 11, being made in one piece instead of in three sections, as before described. It is provided with a central opening 66, the sides of which have a groove or socket 67 formed therein, with which is adapted to engage the shoulder 31 on die 14. The die-holder is hinged like a gate to the plate 21 and is secured to the bottom flange of the cylinder by bolts 68, which pass through the plate 21 and die-holder. The die is inserted through the central opening and the flange 31 engages with the sides of the socket, while the die-holder is hung down or depending from its hinge, after which it is raised to the plate 21 and secured, as shown. The edges 32 of plate 21 prevent upward displacement of the die.

In cases where the central spindle 33 passes through and out of the upper end of the clay-cylinder the horizontal shaft 37 is supported by suitable bearings on the said upper end of the cylinder and a longer shaft 44 employed, the arrangement of the parts and their operation to operate the cutting-knives in all other respects being the same as set forth.

What I claim is—

1. The combination, with a clay-cylinder provided with a plate at its lower end, of a removable die, blocks sliding in horizontal dies on the said plate and adapted to secure the said die in position, and screws for moving the said blocks back and forth in their guides, substantially as set forth.

2. The combination, with a clay-cylinder provided with a plate at its lower end, of a removable die, blocks sliding in dovetailed guides on the said plate and adapted to secure the said die in position, removable nuts secured in bosses on the said plate, and screws engaging with the said nuts and adapted to move the said blocks back and forth in their guides, substantially as set forth.

3. The combination, with the outer die and the bell-core provided with a hollow stem, of an operating-rod passing through the said stem, a circular box mounted on the end of the said rod inside the bell-core, toothed bars provided with knives sliding in guides in the said box, and a toothed pinion secured to the said rod and gearing into the said toothed bars, whereby the knives may be moved back and forth in the said box and revolved to cut off the pipes, substantially as set forth.

4. The combination, with the stationary die, of the vertically-movable table under the die, said table being formed of two horizontally-hinged parts and provided with adjusting-screws, whereby the upper surface of the table may be held horizontal or at an angle under the said die, substantially as set forth.

5. The combination, with the die provided with the inclined projections 58, of the table provided with slots 65, and the bent fingers provided with bolts sliding in the said slots, whereby the position of the fingers may be adjusted to adapt them to engage with the said projections on dies of different sizes, substantially as set forth.

In testimony whereof I affix my signature in presence of two witnesses.

EDWARD BURKILL BROOKE.

Witnesses:
 WILLIAM P. SMYTH,
 E. A. BRIGG.